June 2, 1953  E. L. KINDSETH  2,640,691
EGG SCALE
Filed Nov. 24, 1951
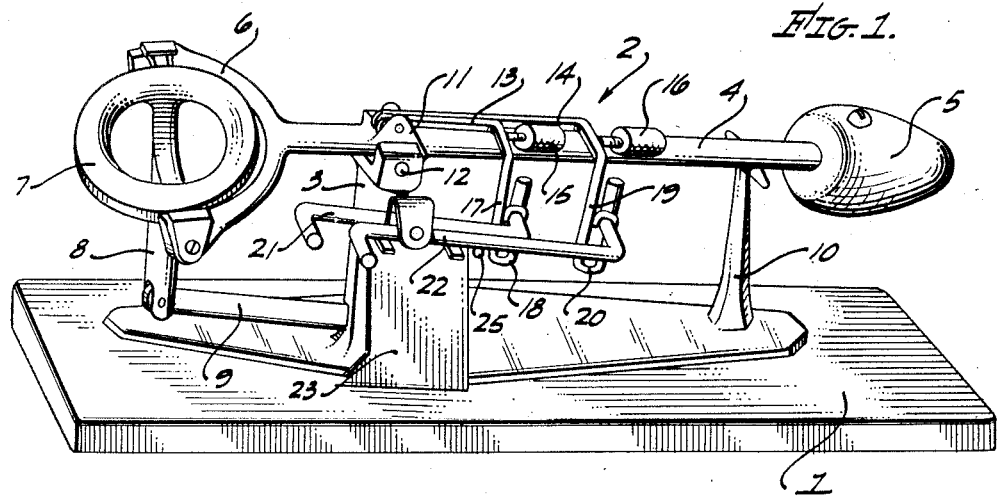
FIG. 1.
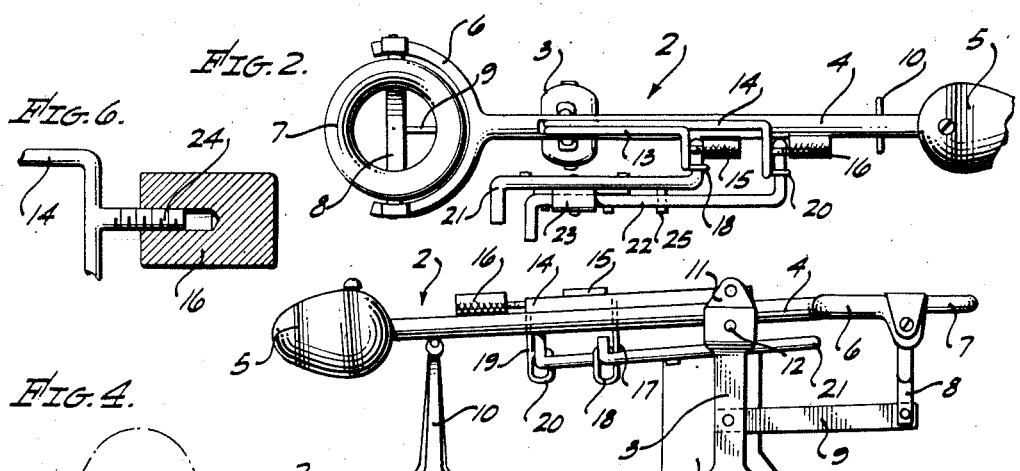
FIG. 6.   FIG. 2.
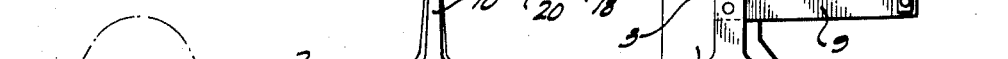
FIG. 4.
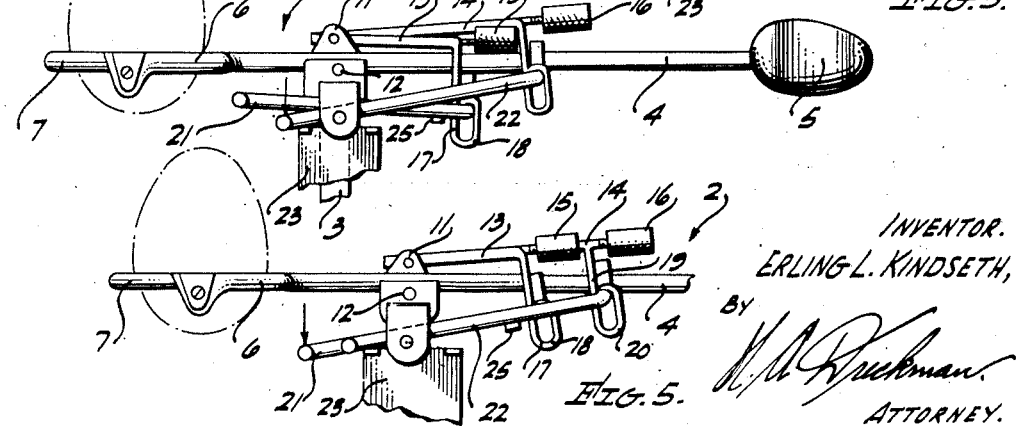
FIG. 3.
FIG. 5.
INVENTOR.
ERLING L. KINDSETH,
BY
ATTORNEY.

Patented June 2, 1953

2,640,691

UNITED STATES PATENT OFFICE 2,640,691

EGG SCALE

Erling L. Kindseth, Redlands, Calif.

Application November 24, 1951, Serial No. 258,043

6 Claims. (Cl. 265—60)

This invention relates to an egg scale of the beam type whereby eggs are graded in three classes. When eggs are placed on the market they are sold in three different grades, small, medium and large. The determination of these three grades is by weight, and consequently an egg scale must be capable of weighing three different weights of eggs. Heretofore it has been difficult to change the beam of the scale so as to weigh the three different types of eggs, and an object of my invention therefore is to provide a simple and effective means of changing the weights on the beam of the scale so that eggs of different weights can be accommodated thereon.

Another object of my invention is to provide a means whereby the weights on the beam of the scale can be quickly changed so that the weight of an egg on the scale can be quickly determined.

A feature of my invention resides in the means whereby a weight can be manually lifted off of the beam of the scale by the operator so as to change the balance of the beam and permitting an egg to be quickly weighed.

Another feature of my invention is to provide a novel egg scale of the character stated in which two or more weights are separately hingedly mounted on the beam of the scale, the weights being separately lifted by manually controlled keys so as to vary the balance of the beam of the scale.

Other objects, advantages and features of invention may appear from the accompanying drawing, the subjoined detailed description and the appended claims.

In the drawing:

Figure 1 is a perspective view of my egg scale.

Figure 2 is a top plan view of the same.

Figure 3 is a side elevation of the same taken from the rear of Figure 1.

Figure 4 is a side elevation of my scale showing one of the auxiliary weights in raised position.

Figure 5 is a fragmentary side elevation of my scale illustrating both of the auxiliary weights in raised position.

Figure 6 is a transverse sectional view of one of the auxiliary weights mounted on an arm.

Referring more particularly to the drawing, the numeral 1 indicates a base on which the beam scale 2 is mounted. A supporting post 3 rises from the base 1 and a horizontal beam 4 is pivotally mounted on the upper end of the post 3 substantially as shown. A weight 5 is mounted on one end of the beam 4 and the other end of the beam is formed with a yoke 6 in which the egg supporting ring 7 is pivotally mounted. To keep the ring 7 in a substantially horizontal position at all times, a link 8 depends from the ring 7 and this link is pivotally attached to a second link 9 which is pivotally secured to the post 3.

A stop 10 rises from the base 1 and the beam 4 rests on this stop at the end adjacent the weight 5. This prevents the weight 5 from dropping down to the base 1 and enables the scale to operate more effectively and quickly. As thus far described, the egg scale is of the usual and well known type. Since the weight 5 is fixed to the beam 4 it will only weigh one class of egg, and consequently it is necessary to add additional weights to the beam 4 to provide for eggs of different classes.

The beam 4 is provided with upstanding ears 11 which are positioned in vertical alignment with the main pivot 12 of the beam. A pair of fingers 13—14 are pivotally secured at one end to the ears 11. At the other end of the fingers 13—14, I provide a weight 15 and 16 respectively, which serve as auxiliary weights when they are resting on the beam 4. The finger 13 is formed with a downward extension 17 which terminates in a loop 18. The finger 14 is provided with a similar downward extension 19 which terminates in a loop 20.

A pair of keys 21—22 are each pivotally mounted on the upper end of a bracket 23 which rises from the base 1. At their outer ends the keys 21—22 extend into the loops 18—20 respectively, thus enabling the operator to elevate either the weight 15 or 16, or both, as desired. Furthermore, the beam 4 can hinge on its pivot 12 without interference of the keys 21—22, and without lifting these keys due to the loops 18 and 20.

For accurate weight adjustment the weights 15 and 16 are each threaded onto the respective fingers 13 and 14, as shown at 24. A lug 25 projects from the key 21 under the key 22, thus permitting the operator to lift both of the weights 15 and 16 simultaneously by simply depressing the one key 21.

In operation:

An egg is placed in the ring 7 and the two movable weights 15 and 16 are resting on the beam 4. If the egg balances these weights, then it is termed "large" and the next egg is placed in the ring 7. If the egg will not balance all three weights 15, 16, and 5, then the weight 16 is first lifted off of the beam 4 by depressing the key 22. If the egg now balances the weights 15 and 5, it is then a "medium." If the egg will still not balance the weights 15 and 5, then the weights 15 and 16 are lifted off of the beam 4 by depressing the single key 21. If the egg merely balances the weight 5, then it is termed "small." It is to be noticed that when the weights 15 or 16 are lifted off the beam 4 they will then not influence the balance of this beam due to the fact that they are pivoted in the same vertical center line as the beam. These weights are held in a raised position off the beam by holding the keys 21 and/or 22 depressed. As soon as pressure is released from the keys the weights 15 and/or 16 will drop on to the beam 4.

Having described my invention, I claim:

1. An egg scale comprising a base, a support rising from the base, a beam pivotally mounted on the support, a weight on one end of said beam, an egg ring on the other end of the beam, a finger, a weight on said finger resting on the beam in one position of the finger, means pivotally mounting said finger on the beam, a key, and means on the base pivotally mounting the key, one end of said key engaging the finger to raise said finger and lift the second named weight off the beam.

2. An egg scale comprising a base, a support rising from the base, a beam pivotally mounted on the support, a weight on one end of said beam, an egg ring on the other end of the beam, a finger, a weight on said finger resting on the beam in one position of the finger, a loop depending from the finger, means pivotally mounting said finger on the beam, a key, and means on the base pivotally mounting the key, one end of said key engaging the loop to raise said finger and lift the second named weight off the beam.

3. An egg scale comprising a base, a support rising from the base, a beam pivotally mounted on the support, a weight on one end of said beam, an egg ring on the other end of the beam, a pair of fingers, a weight on each of said fingers, said weights resting on the beam in one position of the fingers, means pivotally mounting both of said fingers on the beam, a pair of keys, and means on the base pivotally mounting both of the keys, one end of each of said keys engaging one of the fingers to raise said finger and lift one of the second named weights off the beam.

4. An egg scale comprising a base, a support rising from the base, a beam pivotally mounted on the support, a weight on one end of said beam, an egg ring on the other end of the beam, a pair of fingers, a weight on each of said fingers, said weights resting on the beam in one position of the fingers, a loop depending from each of the fingers, means pivotally mounting both of said fingers on the beam, a pair of keys, and means on the base pivotally mounting both of the keys, one end of each of said keys engaging one of the loops to raise said finger and lift one of the second named weights off the beam.

5. An egg scale comprising a base, a support rising from the base, a beam pivotally mounted on the support, a weight on one end of said beam, an egg ring on the other end of the beam, a finger, a weight on said finger resting on the beam in one position of the finger, an ear on said beam, said finger being pivotally attached to said ear, a key, and means on the base pivotally mounting the key, one end of said key engaging the finger to raise said finger and lift the second named weight off the beam.

6. An egg scale comprising a base, a support rising from the base, a beam pivotally mounted on the support, a weight on one end of said beam, an egg ring on the other end of the beam, a finger, a weight on said finger resting on the beam in one position of the finger, an ear on said beam, said finger being pivotally attached to said ear, a loop depending from the finger, a key, and means on the base pivotally mounting the key, one end of said key engaging the loop to raise said finger and lift the second named weight off the beam.

ERLING L. KINDSETH.

References Cited in the file of this patent

UNITED STATES PATENTS

| Number | Name | Date |
|---|---|---|
| 221,149 | Bidwell | Nov. 4, 1879 |
| 573,015 | Lenker | Dec. 15, 1896 |
| 628,558 | Stephens | July 11, 1899 |
| 766,777 | Stimpson | Aug. 2, 1904 |
| 1,259,181 | White | Mar. 12, 1918 |
| 2,558,136 | Hart | June 26, 1951 |